July 1, 1947.  A. SEARLES ET AL  2,423,407
IDLER ROLLER FOR BELT CONVEYORS
Filed March 18, 1943
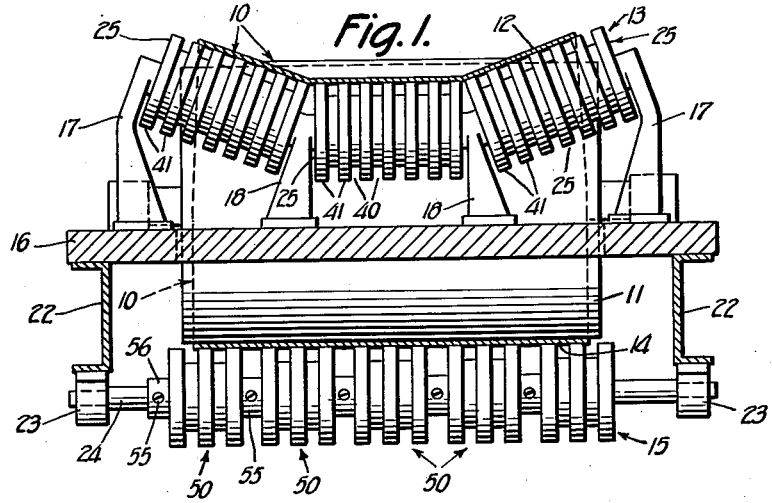
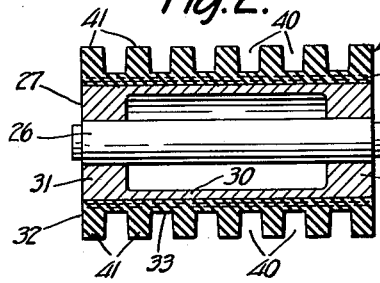
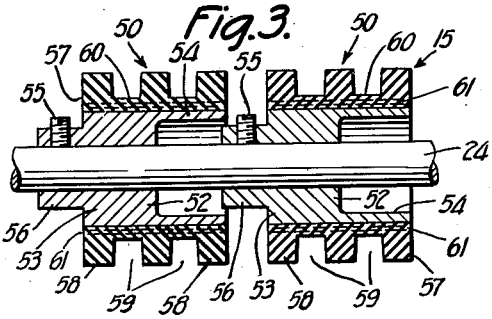
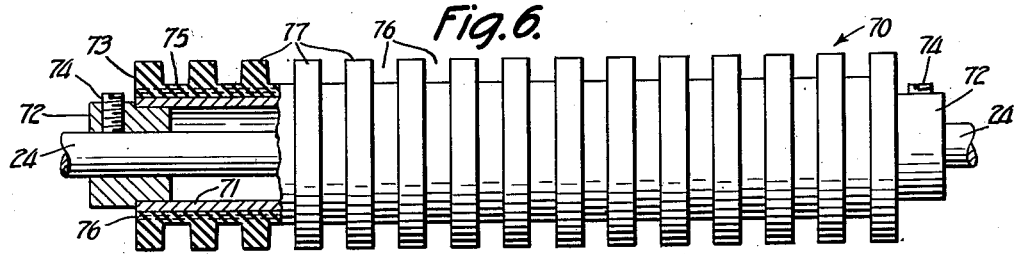
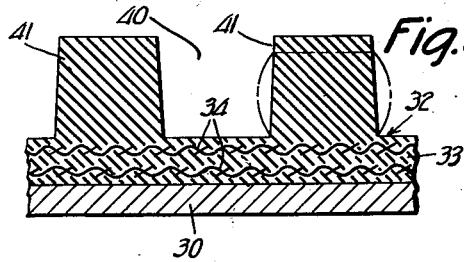
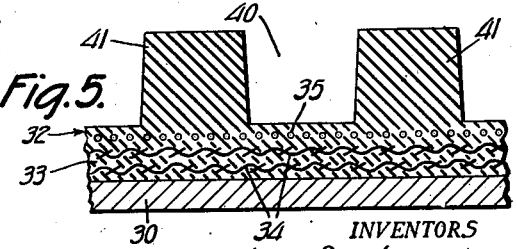
INVENTORS
Amos Searles and
Charles A. Swartz
BY *Moser & Nolte*
ATTORNEYS Patented July 1, 1947

2,423,407

UNITED STATES PATENT OFFICE 2,423,407

IDLER ROLLER FOR BELT CONVEYORS

Amos Searles, Moscow, Pa., and Charles A. Swartz, Yonkers, N. Y.

Application March 18, 1943, Serial No. 479,558

6 Claims. (Cl. 74—230.7)

The present invention relates to conveying apparatus and more particularly to improvements in idlers for belt conveyers.

Endless conveyer belts, especially when carrying bulk material in lump, granular, powdered or other fluent form, are subjected to the destructive impact loading and abrasive action of this material. To absorb the impact on the loaded active run of the belt and reduce the abrasive and corrosive action of the conveyed material, especially on the return or inactive run of the belt, it has been proposed to provide each of the belt supporting idler rolls with a rubber tire or sleeve embracing a metal shell or hub. This rubber sleeve may be cemented or vulcanized to the hub shell, or may be forced over said shell, as for example by compressed air to stretch said sleeve radially outwardly so that it will be frictionally retained on said shell. Under the stress imposed by the weight of the conveyer belt, by the load of the material being conveyed and by the impact of said material falling on said belt, the rubber sleeve is pressed at the section of tangential contact with said belt, thus reducing the thickness of the sleeve at this contact section. Since rubber is substantially incompressible (i. e., is not reducible in volume by pressure), this local reduction in the sleeve thickness causes expansion in those portions of the sleeve flanking the pressed section and circumferential stretching of those portions. This stretching of the rubber sleeve tends to overcome the elastic grip of the entire sleeve on the metal shell or hub, and results in the circumferential and axial creeping of said sleeve on said shell. This in turn causes wear in the inner periphery of the rubber sleeve and undesirable axial displacement of said sleeve on the shell.

One object of the present invention is to provide a new and improved belt conveyer idler of the resilient type.

Another object is to provide a new and improved belt conveyer idler roll having a resilient tire or sleeve so constructed and mounted as to effectively resist creeping action of said sleeve on its supporting hub, while affording the maximum resiliency and cushioning effect.

A further object is to provide a new and improved belt conveyer idler having a resilient sleeve so constructed and mounted as to afford maximum resiliency with minimum amount of resiliently inactive material.

Another object is to provide a new and improved belt conveyer idler roll, having a sleeve of resilient material, constructed and mounted to afford maximum resiliency while requiring the minimum amount of base material for effective hub mounting.

Various other objects, features and advantages of the invention will be apparent from the following particular description, and from an inspection of the accompanying drawings, in which Fig. 1 shows a vertical section through a belt conveyer of the troughed type supported by idlers embodying the present invention;

Fig. 2 shows a longitudinal section through a form of idler roll which is adapted to support a part of the active run of the conveyer belt, and which embodies the present invention;

Fig. 3 shows a fragmentary longitudinal section through a form of idler roll which is adapted to support the inactive return run of the conveyor belt, and which embodies the present invention;

Fig. 4 is a fragmentary detail section of one form of idler roll embodying the present invention;

Fig. 5 is a fragmentary detail section of another form of idler roll embodying the present invention; and Fig. 6 is a side elevation partly in longitudinal section of another form of idler which is adapted to support the inactive return run of the conveyor belt, and which embodies the present invention.

Referring to Fig. 1 of the drawings, the conveyor is shown of the type comprising an endless belt 10, trained over end rollers 11 in the conventional manner, and having its upper active run 12 supported on idlers 13, and its lower inactive return run 14 supported on idlers 15. The idlers 13 and 15 are supported on a suitable frame structure which for example may comprise a member 16 supporting a pair of end brackets 17 secured to the upper side of said member and supporting the shaft ends of each idler 13, and a pair of intervening bearing brackets 18 also secured to the upper side of said member for supporting the intermediate shaft sections of said idler 13. This frame structure also includes a pair of longitudinal stringers 22 which comprise a portion of the conveyor supporting frame to which the end bearings 23 of the axle or shaft 24 of the idler 15 are attached along the lower edges of stringers 22. The frame member 16 is attached to the upper edges of stringers 22.

The upper idler 13 desirably comprises a plurality of rolls 25, three being shown, angularly arranged end to end to trough the belt 10 in supported loaded position thereof. Each of these idler rollers 25 comprises an axle or shaft 26 (Fig. 2) on which is supported a hub 27 which is made of metal or other suitable rigid material, and which has a hollow cylindrical shell 30 with end walls 31 embracing said axle. This hub 27 may be mounted on the axle 26 to rotate either therewith or thereabout. Embracing the hub 27 is an integral sleeve 32 of resilient material such as rubber, firmly anchored to the outer periphery of said hub against displacement with respect thereto, as for example by cementing or vulcanizing.

As a feature of the present invention, the annular base 33 of the unitary sleeve 32 adjoining the periphery of the hub 27 is constructed to effectively resist stretching under load, while the section of said sleeve radially outwardly beyond said base is made sufficiently resilient to absorb effectively impact on the belt 10. In the constructions shown in Figs. 2 and 4, this annular sleeve base 33 is reinforced against stretching by a textile fabric 34 embedded in said base and tubularly extending around the hub 27. This fabric is desirably duck, but as far as certain aspects of the invention are concerned, it may be of any other type. In the form of the invention shown in Fig. 4, two of these tubular duck sheets or layers 34 are shown concentrically embedded in the sleeve base 33. Any number of these duck layers, however, may be provided according to the size of the idlers.

In the form of the invention shown in Fig. 5, the sleeve base 33 is reinforced against stretching by metal rings or wires 35 embedded in said base and encircling the hub 27. These metal rings or wires 35 are desirably in the form of a continuous circumferentially or helically wrapped wire formed in one or more layers and having the ends suitably restrained to prevent release of tension. These metal rings or wires 35 may be provided in place of the duck layers 34, or may supplement them as shown. For instance, in the form of the invention shown in Fig. 5, there is provided two duck layers 34 and one helical wire layer 35 concentrically arranged around the hub 27 and embedded in the sleeve base 33.

The fabric sheets 34 and the wire layer 35 in both of the forms shown in Figs. 4 and 5, are assembled on a rigid form along with layers of friction material such as rubber in cement or sheet form, so as to bind the whole into a homogeneous mass during the curing or vulcanizing process. To the outer periphery of this reinforcing sleeve or cylinder is applied a sufficient quantity of resilient material to form a grooved and complete structure as controlled and molded during the process of vulcanization. The reinforcing members 34 and 35 serve to prevent stretching of the sleeve base 33 when the radially outer resilient section of the sleeve 32 is compressed by load or impact, and thereby prevent said sleeve from creeping circumferentially or axially on the hub 27.

Because of the reinforcement of the annular sleeve base 33, the thickness of this base may be reduced materially from the conventional form which requires considerable material to mount the sleeve on the hub, so that there is less inactive rubber employed in the construction of the present invention.

To provide free space for the displacement of the unreenforced resilient material of the sleeve 32 while under compression and to attain maximum resiliency, said sleeve is provided with a series of circumferential grooves 40 (Figs. 2, 4 and 5) spaced along said sleeve to form a series of ring-like treads, ribs or ridges 41, alternately separated by said grooves. The depth of these grooves 40 is approximately equal to the resilient unreenforced portion of the sleeve 32, so that the load supporting resilient treads 41 are free to bulge axially outwardly due to the clearances provided by the flanking grooves as indicated in dot and dash lines in Fig. 4. The spacing of the grooves 40 as well as their width relative to the load carrying treads 41 may be made to suit the conditions of load, wear and resiliency required. Each of the treads 41 desirably has a cross-section slightly tapering radially outwardly to afford its widest section at the base to facilitate molding operations.

The deflection of a rubber body is approximately inversely proportional to the ratio of the area of the loaded surface to the area of the unconfined edges bordering on that area. With a grooved sleeve construction as described, this ratio is materially decreased so that the cushioning and resilient effects of the sleeve 32 are materially increased.

The idler constructions shown in Figs. 2, 4 and 5 are also applicable to the idlers 15 for supporting the return or inactive belt run 14 as shown in Fig. 3. In this form of idler, a series of separable rolls 50 are supported on the axle or shaft 24. Each of these idler rolls 50 comprises a metal hub 52 having a wall 53 at one end embracing the axle 24 and a hollow cylindrical shell 54 extending axially beyond one end of said hub wall. Each of the hubs 52 is retained on the axle 24 for rotation therewith by any suitable means, as for example by set screws 55 threaded in portions 56 of hubs 52 and bearing on said axle. The hub portion 56 into which these set screws 55 are threaded are preferably reduced in diameter to permit them to be partially nested into the hollows of adjoining shells 54 while rendering said set screws easily accessible for turning.

Each of the hubs 52 carries a sleeve 57 of resilient material such as rubber, anchored to its respective hub, as for example by cement or vulcanization, and devised as in the constructions of Figs. 2, 4 and 5 with alternate treads 58 and grooves 59. The annular base 60 of this sleeve 57 is reenforced against stretching by embedment in said base of one or more tubular layers 61 of textile fabric such as duck, as in the constructions already described. These duck layers 61 can be replaced or supplemented by wire as in the construction of Fig. 5.

The idler construction of Fig. 3 besides having the advantages set forth in connection with the constructions of Figs. 2, 4 and 5, has the added advantages when applied to the return run of the belt conveyor of avoiding corrosion and abrasive wear, and of being at least partially self-cleanable. These added advantages result from the grooves 59, which provide channels of escape for the fluid and fine material adhering to the surface of the belt 10.

In the case of the conventional continuous cylindrical idler, the fluid and fine material adhering to the surface of the belt 10 is squeezed or squeegeed off the belt and accumulates on the approaching side of the idler to cause abrasion and corrosion of the belt and of the idler. Furthermore, the accumulation of this fine abrasive material on the surface of the conventional idler causes variation in the diameter of the idler, and thereby causes not only wear of the belt but also misalignment thereof.

In the construction of Fig. 3, the accumulation which is permitted to escape in the grooves 59 partially adheres to the surface of the belt 10 until a thickness has been collected sufficient to overcome the cohesive and capillary attraction of said accumulation, and then drops off. Another part of this material accumulates at the edges of the treads 58 of the idler, and is subsequently thrown off by centrifugal force. The abrasive fine material is thus safely disposed against destructive accumulation on the surface of the idler.

In Fig. 6 is shown another form of idler which can be employed to support the return inactive belt run 14. In this form, instead of providing a plurality of separable idler rolls as in the construction of Fig. 3, there is provided a single idler roll 70 having a single cylindrical metal hub shell 71 supported on and affixed at its ends to bushings 72 embracing the axle or shaft 24. These hub bushings 72 are affixed to the axle 24 as for example by set screws 74 threaded in said bushings and bearing on said axle, so that the idler roll 70 rotates with said axle.

Cemented, vulcanized or otherwise anchored to the outer periphery of the hub shell 71 is a single sleeve 73 of resilient material such as rubber, having an annular base 75 reenforced against stretching with textile fabric 76 preferably duck, or with wire, or if desired, with both, as in the constructions of Figs. 1 to 5. This sleeve 73 has alternate grooves 76 and treads 77 serving the purposes already described in connection with the other forms of construction.

Although the idler rolls are shown in all the forms without anti-friction bearings, such bearings can be provided inside the metal idler shell.

As many changes can be made in the above apparatus, and many apparently widely different embodiments of this invention can be made without departing from the scope of the claims, it is intended that all matter contained in the above description or shown in the accompanying drawings shall be interpreted as illustrative and not in a limiting sense.

We have described what we believe to be the best embodiments of our invention. We do not wish, however, to be confined to the embodiments shown, but what we desire to cover by Letters Patent is set forth in the appended claims.

We claim:

1. A belt conveyor idler for supporting the active run of the belt comprising a plurality of idler rolls, each of said rolls comprising a metal hub, an axle for supporting said hub, a sleeve of resilient material closely embracing said hub and anchored thereto against displacement relative thereto, and means for reinforcing the annular base of said sleeve against stretching while the outer belt supporting peripheral portion of said sleeve is free to distort elastically under pressure, said reinforcing means being spaced radially outwardly from the inner periphery of the sleeve, whereby said hub is free from direct gripping contact by said reinforcing means, and means for supporting said rolls in angular relationship to trough the conveyor belt thereon.

2. A belt conveyor idler as covered in claim 1, characterized in that the sleeve has alternate circumferential grooves and treads radially outwardly beyond the sleeve base.

3. A belt conveyor idler for supporting the inactive return run of the belt comprising an axle, a plurality of metal hubs supported on said axle and removably retained thereon against relative axial movement, a sleeve of resilient material closely embracing each of said hubs and anchored thereto against displacement relative thereto, and means for reinforcing the annular base of said sleeve against stretching, while the outer peripheral belt supporting portion of said sleeve is free to deflect elastically under pressure, said reinforcing means being spaced radially outwardly from the inner periphery of said sleeve, whereby said hub is free from direct gripping contact by said reinforcing means.

4. A belt conveyor idler roll comprising a hub of rigid material, a sleeve of resilient material embracing said hub and fixedly retained thereon, one or more annular textile fabric sheets embedded in the annular base of said sleeve, and an annular wire embedded in said base, said sheets and said wire reenforcing said base against stretching, and being spaced radially outwardly from the inner periphery of said sleeve, whereby said hub is free from direct gripping contact by said reenforcing sheets, the outer peripheral belt supporting section of said sleeve being free to deform elastically under pressure.

5. In a belt conveyor idler roll, the combination comprising a hub of rigid material, a sleeve of resilient material embracing said hub and fixedly retained thereon, and means separate from said material and embedded in said sleeve for reenforcing the annular base of said sleeve adjoining the periphery of said hub against stretching, whereby circumferential and axial creeping of said sleeve on said hub is resisted, the outer peripheral belt supporting section of said sleeve being free to deform elastically under pressure, said reenforcing means being spaced radially outwardly from the inner peripheral surface of said sleeve, whereby said hub is free from direct gripping action of said reenforcing means, and the annular layer of material between said reenforcing means and said inner peripheral surface having a resiliency substantially the same as that of the outer peripheral belt supporting section of said sleeve.

6. A belt conveyor idler for supporting the inactive return run of the belt comprising an axle, a plurality of metal hubs supported on said axle and removably retained thereon against relative axial movement, a sleeve of resilient material closely embracing each of said hubs and anchored thereto against displacement relative thereto, said sleeve having alternate circumferential grooves and treads radially outwardly beyond the sleeve base, and means for reenforcing the annular base of said sleeve against stretching, while the outer peripheral belt supporting portion of said sleeve is free to deflect elastically under pressure, said reenforcing means being spaced radially outwardly from the inner periphery of said sleeve, whereby said hub is free from direct gripping contact by said reenforcing means.

AMOS SEARLES.
CHARLES A. SWARTZ.

REFERENCES CITED

The following references are of record in the file of this patent:

UNITED STATES PATENTS

| Number | Name | Date |
| --- | --- | --- |
| 1,487,945 | Johnston | Mar. 25, 1924 |
| 1,748,100 | Avery | Feb. 25, 1930 |
| 1,803,357 | Robins | May 5, 1931 |
| 1,576,924 | Malloy | Mar. 16, 1926 |
| 2,169,623 | Weiss | Aug. 15, 1939 |
| 2,169,624 | Weiss | Aug. 15, 1939 |

FOREIGN PATENTS

| Number | Country | Date |
| --- | --- | --- |
| 481,707 | Great Britain | Mar. 16, 1938 |